United States Patent

[11] 3,625,616

[72] Inventor Walter W. Lee
    Allendale, N.J.
[21] Appl. No. 836,351
[22] Filed June 25, 1969
[45] Patented Dec. 7, 1971
[73] Assignee The Bendix Corporation

[54] INTERFEROMETRIC PRESSURE SENSOR
    11 Claims, 2 Drawing Figs.
[52] U.S. Cl. .................................................. 356/107,
                                                          73/388
[51] Int. Cl. .................................................. G01b 9/02
[50] Field of Search ...................................... 356/106,
                                                          107, 113

[56] References Cited
    UNITED STATES PATENTS
    1,770,355  7/1930  Doi .............................. 356/107
    2,256,804  9/1941  Hurley ........................... 356/107
    3,381,134  4/1968  Wolf ............................. 356/107 X FOREIGN PATENTS
386,315  1/1933  Great Britain ................ 356/113

OTHER REFERENCES
" Laser Pressure Gauge." An article in Measurement and Control, Vol. 3, No. 11, Nov. 1964 p. 423.

Primary Examiner—Ronald L. Wibert
Assistant Examiner—T. Major
Attorney—Plante, Hartz, Smith & Thompson ABSTRACT: A pressure sensor having two chambers each filled to a predetermined pressure with a gas of high-refractive index and sealed. To measure pressure the gas in one chamber is subjected to the pressures to be measured by changing the volume of the chamber by a bellows. A beam of coherent light is split and passed through the two chambers and then recombined. A fringe counter detects fringe shifts caused by differences in the optical paths due to differences between the measured and predetermined pressures and provides a signal corresponding thereto. To measure differential pressure the gas in both chambers is subjected to the pressures to be measured.

INTERFEROMETRIC PRESSURE SENSOR

BACKGROUND OF THE INVENTION

1. Field of the Invention

This invention relates to pressure sensors and more particularly to an interferometric pressure sensor.

2. Description of the Prior Art

Heretofore interferometric pressure sensors had chambers having limited optical lengths because of the nonavailability of coherent light sources having relatively long coherence lengths. Thus the accuracy and sensitivity of the sensor could not be enhanced by increasing the chamber length. The chambers were filled with air and thus the accuracy and sensitivity of the sensors were fixed by the change in refractive index of air caused by a corresponding change in sensed pressure. The chamber subjected to the sensed pressure was open to the atmosphere and the air therein had varying levels of humidity and pollutants which introduced changes in the refractive index of the air and errors in the pressure sensor.

SUMMARY OF THE INVENTION

The present invention contemplates an interferometric pressure sensor having two chambers each filled to a predetermined pressure with a gas having a high-refractive index and sealed. To measure pressure one chamber is used as a reference while the pressure in the other chamber changes in accordance with the pressure to be measured. A beam of coherent light having a relatively long coherence length is split and passed through both chambers and then recombined forming a beam having interference fringes. A fringe counter detects shifts in the interference fringes caused by changes in the refractive index of the gas with changes in pressure. The shifts in the interference fringes correspond to the changes in the sensed pressures.

The invention also contemplates a differential pressure sensor for measuring a difference between two pressures. One pressure is applied to one chamber and the other pressure to the other chamber subjecting the gas therein to the pressures. The fringe shift corresponds to the differential pressure.

The chambers are sealed from the atmosphere to eliminate humidity and pollutants and the errors caused thereby. By using currently available coherent light sources such as a laser beam providing a light beam having a coherence length of approximately 2 meters the chamber length can be increased to provide better sensitivity and accuracy. Accuracy and sensitivity are also increased by using a gas having a refractive index substantially higher than air. Thus for a corresponding change in pressure the gas having a high-refractive index produces a greater fringe shift than air, resulting in greater sensitivity and accuracy.

One object of the invention is to provide an interferometric pressure sensor having greater sensitivity and accuracy than those heretofore available.

Another object of the invention is to provide an interferometric pressure sensor that is uneffected by humidity or pollutants.

Another object is to provide an interferometric pressure sensor having longer optical lengths than were heretofore available.

Another object of the invention is to provide a pressure sensor using a gas having a high index of refraction.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
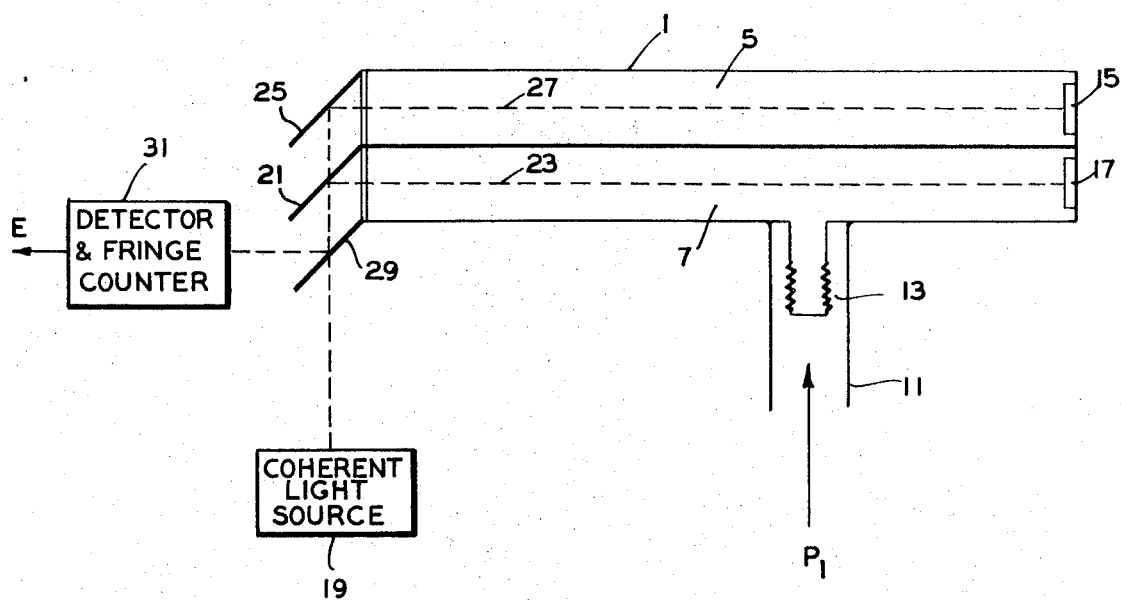
FIG. 1 is a schematic illustration of one embodiment of the present invention used to measure pressures.

Referring to FIG. 1 there is shown a novel pressure sensor with a casing 1 having chambers 5 and 7. The chambers are filled with a high-refractive index gas such as octane, dodecane, carbon disulfide carbon tetrachloride or trichlorofluromethane and sealed at a predetermined pressure and temperature. Chamber 5 must be maintained at the predetermined temperature to avoid pressure changes caused by variations in temperatures. Chamber 7 has a bellows 13 in one wall thereof which extends into a conduit 11 to which a pressure $P_1$ to be measured is applied. Bellows 13 separates the gas within the chamber from the atmosphere of pressure $P_1$ and transmits pressure $P_1$ to the gas in the chamber.

Chambers 5 and 7 have mirrors 15 and 17 affixed to one end and positioned to receive light from the opposite end and to reflect the received light directly back along a path travelled by the received light. A light source 19 provides a coherent light beam having a coherence length of 2 meters or greater. A beam splitter 21 is positioned opposite mirror 17 so as to direct a portion of the light beam from source 19 along a path perpendicular to mirror 17. A mirror 25 is positioned opposite mirror 15 so as to direct light from source 19 along path 27 perpendicular to mirror 15. Beam splitter 21 and mirror 25 direct reflected light beams from mirrors 15 and 17 to a beam splitter 29 positioned so as to combine the beams forming a beam having interference fringes and to direct the beam to a detector and fringe counter 31 which is responsive thereto for providing an output signal E. The fringe counter is of a type having a resolution of about one-tenth of a fringe.

While the preferred embodiment of the invention utilizes mirrors 15 and 17 to reflect the light and increase the effective length of the chambers, it is to be understood that the light could be passed through the chambers only once and combined and detected on the opposite end of the chambers.

In operation the refractive index of the gas in chamber 7 varies with pressure $P_1$ to which it is subjected while the refractive index of the gas in the chamber 5 remains constant at the predetermined pressure. Variation in the refractive index of the gas in chamber 7 causes the optical length of path 23 to change. Thus the beam following path 23 travels a different optical distance than the beam following path 27 and when the light is recombined by beam splitter 29 it is at a different phase causing interference fringes which are detected by detector 31. As pressure $P_1$ changes from the predetermined pressure the optical length of path 23 changes causing the fringes to shift in a direction and amount corresponding to the change in pressure. Detector and fringe counter 31 detects the fringe shift and counts the fringes as they are shifted. The number of fringes corresponds to a difference between the predetermined pressure and the measured pressure $P_1$. The output signal E from detector and fringe counter 31 therefore corresponds to the measured pressure $P_1$.

A coherent light having coherence length of approximately 2 meters or greater is used to allow the chambers to have a greater length than was heretofore available while maintaining coherence of the light. Longer chambers provide for longer optical paths which result in greater accuracy and sensitivity.

Bellows 13 separates the gas in chamber 7 from the atmosphere of pressure $P_1$ while transmitting pressure $P_1$ to the gas in chamber 7. Thus the gas in the chamber remains pure and the refractive index does not vary as a result of changes in humidity and pollutant levels in the atmosphere.

For a corresponding pressure change a gas of high-refractive index experiences a greater change in refractive index than does a gas of lower refractive index such as air. By using a high-refractive index gas rather than air greater sensitivity and accuracy is achieved.

The errors caused by humidity and pollutants that were prevalent in the prior art are eliminated by the use of bellows 13 thus providing improvements over the prior art. The invention is operative when chambers 5 and 7 are filled with air and also when chamber 5 is at a vacuum; however, it is preferred that the chambers be filled with a high index of refraction gas so as to achieve a greater sensitivity and accuracy.

Figure 2:
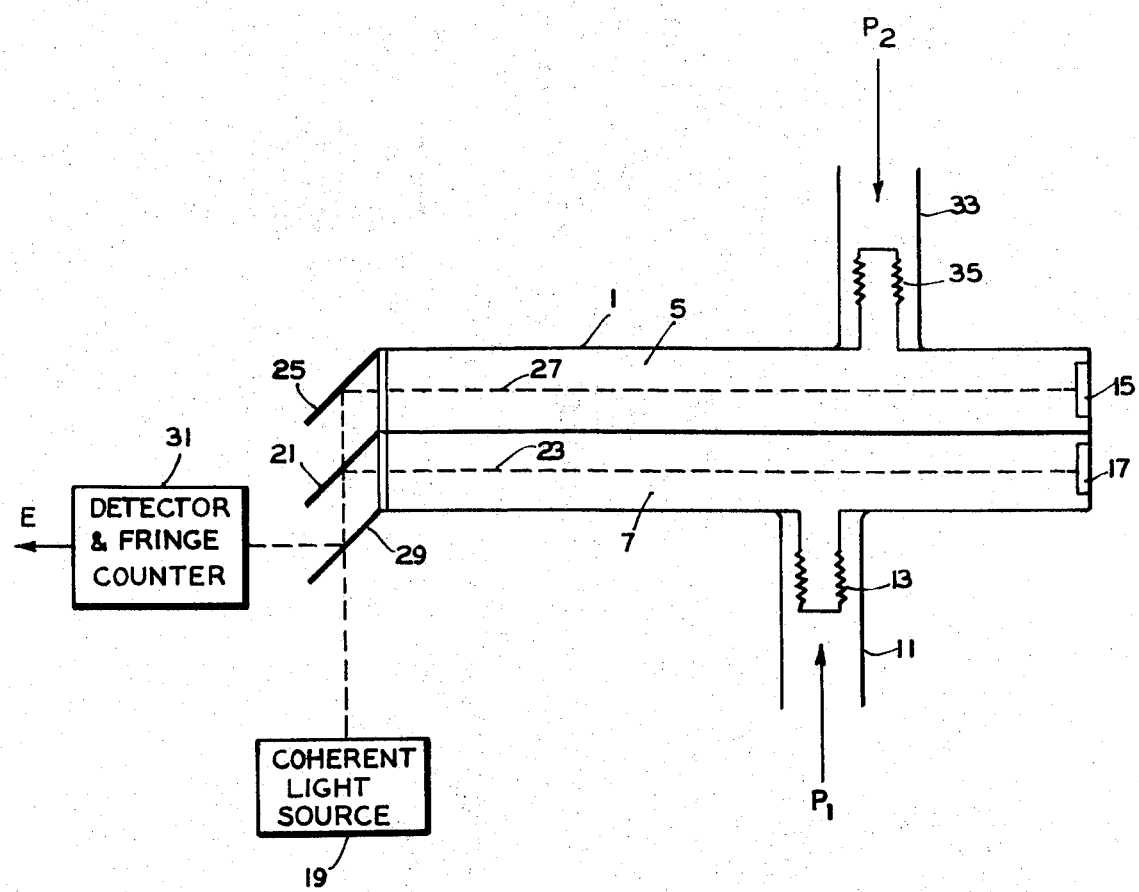
FIG. 2 is a schematic illustration of a second embodiment of the present invention used to measure a pressure differential.

Referring to FIG. 2 there is shown a modification of the embodiment of FIG. 1. Chamber 5 has a bellows 35 in one wall thereof which extends into a conduit 33 to which a pressure $P_2$ is applied. Conduit 11 has a pressure $P_1$ applied thereto as in FIG. 1.

In operation the refractive indices of the gases in chambers 5 and 7 vary with pressures $P_2$ and $P_1$ respectively. The optical lengths of paths 23 and 27 vary in accordance with the respective indices of refraction causing fringe shifts corresponding to the difference between pressures $P_1$ and $P_2$ and signal E corresponds to the pressure differential. In this embodiment there is no need to maintain chamber 5 at the predetermined temperature because the gas therein will be at the applied pressure which will not vary with temperature.

Thus the present invention provides a pressure sensor having increased sensitivity and accuracy resulting from increased optical length and the use of a gas having a high-level index of refraction. The sensor is unaffected by varying humidity and pollution levels in the atmosphere of the measured pressure.

What is claimed is:

1. An interferometric pressure sensor for measuring pressure, comprising:
    first and second chambers each containing a gas of high refractive index and each being sealed at a predetermined pressure, at least one of said chambers having means for applying the pressure to be measured to the chamber to change the pressure in the chamber to correspond to the pressure to be measured;
    a light source providing a beam of coherent light;
    beam splitter proximate one end of each of said chambers means for splitting the light beam into two beams and for passing the one beam through the first chamber and the other beam through the second chamber reflective means proximate the opposite end of said chambers for reflecting said beams back to said beam splitter for recombining the beams into a beam having interference fringes which shift in accordance with a difference between the pressures in the chambers; and
    photoresponsive means for detecting the fringe shift.

2. A pressure sensor of the kind described in claim 1 for measuring the difference between two pressures in which both of said chambers have means for applying the pressures to the chambers so that the pressures in the chambers correspond to the two pressures, the fringe shift corresponding to the difference between the pressures.

3. A pressure sensor as described in claim 1, in which the first means includes a bellows for changing the volume of the chamber.

4. A pressure sensor as described in claim 1, in which the gas of high-refractive index is selected from the group consisting of octane, dodecane, carbon disulfide, carbon tetrachloride and trichlorofluromethane.

5. A pressure sensor as described in claim 1, in which the light source provides a beam of coherent light having a relatively long coherence length.

6. A pressure sensor as described in claim 1, in which the light source comprises a laser device.

7. A pressure sensor as described in claim 1, in which the photoresponsive means comprises a photodetector and fringe counter for providing a signal corresponding to the fringe shift.

8. A pressure sensor as described in claim 2, in which the gas of high-refractive index is selected from the group consisting of octane, dodecane, carbon disulfide carbon tetrachloride and trichlorofluromethane.

9. An interferometric pressure sensor for measuring pressure, comprising:
    two chambers each containing gas of high-refractive index and sealed at predetermined pressure, at least one of said chambers including means for applying the pressure to be measured to the chamber to subject the gas in the chamber to the pressure to be measured;
    a laser device providing a beam of coherent light having a relatively long coherence length;
    beam splitter means proximate one end of said chambers for splitting the light beam into two beams and for passing the one beam through one chamber and the other beam through the other chamber reflective means proximate the opposite end of said chambers for reflecting said light beams back to said beam splitter means, for recombining the beams into a beam having interference fringes which shift in accordance with the pressure; and
    photoresponsive means receiving said recombined beams for detecting the fringe shift.

10. A pressure sensor of the kind described in claim 12 for measuring the difference between two pressures in which both chambers have means for applying the pressures to the chambers to change the pressures in the chambers to correspond to the two pressures, the fringe shift corresponding to the difference between the pressures.

11. A pressure sensor as described in claim 2, in which the light source comprises a laser device.

* * * * *